Jan. 19, 1937.  P. UPHAM  2,068,633
SNAP FASTENER
Filed May 22, 1934
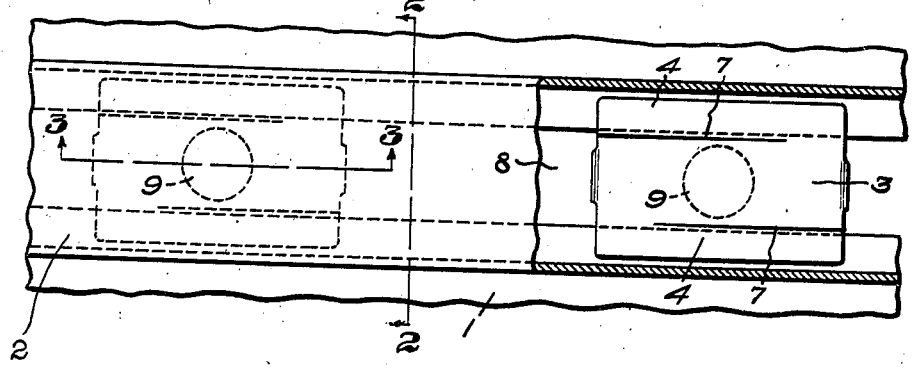
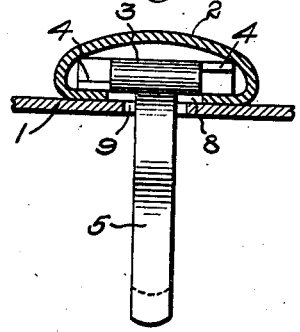
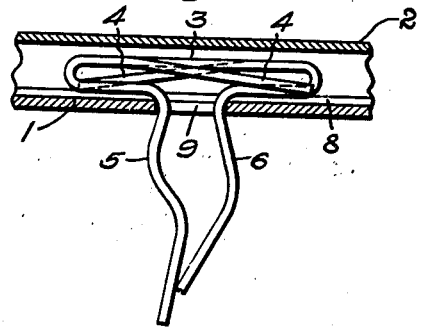
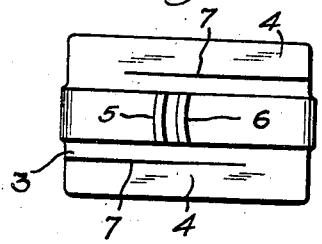
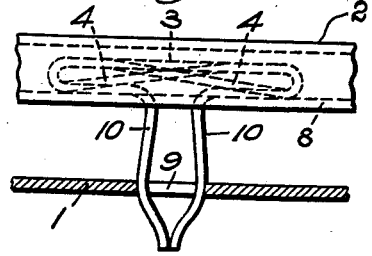
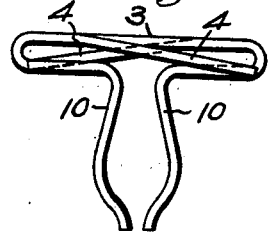
Inventor:
Preston Upham
by Walter S. Jones
Atty.

Patented Jan. 19, 1937

2,068,633

UNITED STATES PATENT OFFICE 2,068,633

SNAP FASTENER

Preston Upham, Brookline, Mass., assignor to United-Carr Fastener Corporation, Cambridge, Mass., a corporation of Massachusetts Application May 22, 1934, Serial No. 726,974

5 Claims. (Cl. 24—213)

My invention aims to provide improvements in snap fastener secured installations and snap fastener studs for the same.

In the drawing which illustrates preferred embodiments of my invention:—

Figure 1 is a plan view of an installation of a molding strip showing two fastener members in the molding and showing a part of the molding broken away to expose one of the fastener members;

Fig. 2 is a section taken on the line 2—2 of Figure 1;

Fig. 3 is a section taken on the line 3—3 of Figure 1, the stud member being shown in side elevation;

Fig. 4 is a bottom plan view of the snap fastener stud illustrated in Figs. 1, 2 and 3;

Fig. 5 is a part section and part elevational view of a molding strip and supporting structure, together with a modified form of fastener stud in the act of pressing the stud through an aperture in the supporting structure; and Fig. 6 is a side elevation of the fastener stud illustrated in Fig. 5.

My invention, as illustrated by the annexed drawing, relates particularly, though not exclusively, to the installation of molding and like hollow strips to sheet metal supporting structures by the use of separable snap fastener stud members. Heretofore a number of fastener members have been satisfactorily used in the same type of installation, but it has been found that none of those fastener members can be successfully used where the molding strip is very narrow and the aperture in the supporting structure is relatively small. For instance, the well known types of molding fasteners are not readily adapted to be used to attach moldings from ¼ of an inch to ⅜ of an inch wide, nor are they adapted to enter apertures about ⅛ to $\frac{3}{32}$ of an inch in diameter. My improved fastener members, which will be hereinafter more specifically described, are particularly adapted for use with the narrow moldings and the small apertures.

The installation and fastener stud illustrated in Figs. 1 through 4 inclusive includes a thin sheet metal supporting member 1 upon which is superposed a tubular molding 2 of any suitable cross-sectional design and one or more snap fastener stud members assembled with the molding 2 prior to attachment thereof to the supporting member 1.

Each snap fastener member is preferably formed from a single piece of sheet metal and has a base portion 3, a pair of spring portions 4—4 at opposite sides of the base and a pair of yieldable socket-engaging portions 5 and 6 located beneath the base portion 3, as clearly illustrated in Figs. 3 and 4. The spring portions 4—4 are preferably formed by dividing the base 3 by slits 7—7 extending parallel to the longitudinal edges of the base. One slit (Fig. 4) extends from one end of the base toward, but terminating short of, the other end. The other slit 7 extends from the opposite end. Each of the spring portions 4—4, along the edge of its slit 7, is bent at an angle to the plane of the base 3 so that the free end is spaced from the plane of the base, as clearly illustrated in Fig. 3. The yieldable socket-engaging portions 5 and 6 are connected to the ends of the base 3 (Figs. 3 and 4) and extend toward each other underneath and spaced from the base and then extend outwardly at right angles to the plane of the base in opposed face-to-face relationship. The yieldable arms 5 and 6 preferably diverge for a portion of their lengths and then converge toward their free ends. The yieldable arm 5 preferably diverges for a lesser length than the length of the diverging portion of the arm 6 (Fig. 3) and then abruptly changes its direction toward the arm 6 for the purpose hereinafter more fully described. The extreme end portions of the arms 5 and 6 are preferably closely associated so that they may be in contact with each other at all times or at least when pressure is exerted upon one arm toward the other during attachment and detachment of the stud with the supporting structure 1.

The normal operation of assembling the parts of the installation already described may be somewhat as follows: First the base portion 3, together with the spring portions 4—4, is entered through the open end of the molding 2 and slid into a desired position with the arms 5 and 6 passing out through the longitudinal opening 8 at the under side of the molding. The spring arms 4—4 (Figs. 2 and 3), together with the base 3, cooperate to take up the space within the hollow molding 2 so that the fastener stud may be held against accidental movement in any desired position. At the same time the spring portions 4—4 will yield to permit any desired shifting movement. Attention is also directed to the fact that these spring portions 4—4 extend in opposite directions and their free ends are adapted to bite into the material of the molding to prevent too free shifting of the fasteners. When the fasteners are properly located and attached to the molding the entire assembly is then moved toward the supporting member 1 which is provided with one or more preformed stud-receiving apertures 9 of relatively small diameter. As the yieldable arms 5 and 6 pass through an aperture 9 they are forced toward each other because they are farther apart at certain points than the diameter of the aperture. During the entrance of the arms 5 and 6 through the aperture 9 they do not follow a straight path but rather wiggle through due to the peculiar shape of the arm 5. The reason for the peculiar shape of the arm 5 is to provide maximum flexing of the arms 5 and 6, minimum movement of the arms 5 and 6 toward each other and maximum holding power of the arms against the supporting member 1 adjacent to the aperture 9. During the entrance of the arms 5 and 6 into the aperture 9 the free end portions of the arms engage each other at least before the arms have been brought together at least far enough to permit passage through the aperture 9 so that further movement of the arms toward each other is effected by flexing throughout the length of the arms rather than flexing of the arms adjacent to the base 3. This distribution of flexing throughout the length of the arms prevents setting which would be likely to occur in a fastener of relatively small dimensions.

The installation and fastener illustrated in Figs. 5 and 6 are the same as those already described in connection with Figs. 1 through 4, inclusive, with the exception of the shape and length of the yieldable stud-engaging portions. Therefore, I shall use the same reference characters in connection with the description of this installation and fastener where the parts are the same.

One of the important features of my invention is in the arrangement of the socket-engaging portions whereby when they are forced toward each other when pressed through a stud-receiving aperture, the arms will be brought into contact at their free ends before they have been brought together close enough to pass through the stud-receiving aperture.

In the stud member illustrated in Figs. 5 and 6 the socket-engaging arms 10—10 diverge and then converge in a uniform manner. The extreme end portions are closely associated with each other and may be normally in contact, or at least so close together that they will contact upon relatively slight movement toward each other, as clearly illustrated in Fig. 6. The operation of this fastener and the assembly of the parts is the same as previously described with the exception of the fact that the stud enters by a straight axial movement through the aperture 9 in the supporting member 1. This type of stud is particularly useful where the length of each arm is restricted, while the construction of the arms illustrated in Fig. 3 is more useful where the arms can be made longer.

My improved fasteners are simple in construction, efficient in operation and are relatively easy to manufacture. The socket-engaging portions are preferably of less width than the base where they pass through the slot 8 and, of necessity, relatively narrow because they have to enter an unusually small stud-receiving aperture. However, the arms should be of greater width than thickness of material used in order to provide the best results.

While I have illustrated and described preferred embodiments of my invention, I do not wish to be limited thereby, because the scope of my invention is best defined by the following claims.

I claim:

1. A snap fastener stud of the class described having a base portion, said base portion being split to provide spring portions at opposite sides thereof, said spring portions being bent out of the plane of the base, and said snap fastener stud having a pair of opposed yieldable arms extending from said base portion and being shaped to make snap fastening engagement with a supporting member, one of the base springs being connected to one end of the base and extending at an angle to the plane thereof and the other base spring being connected to the other end of the base and extending at an angle thereto thereby to provide brake means against accidental movement of the fastener stud relative to a member.

2. A snap fastener stud of the class described formed from a single piece of sheet metal and having a base portion, a pair of yieldable socket-engaging portions connected to and extending from beneath said base portion and an elongated spring portion connected to the base, on each side of the socket engaging portion, said spring portions being integral with the base portion and connected thereto at one end so as to lie within the marginal dimensions of the base, said spring portions being inclined relative to the plane of the base for the purpose described.

3. A snap fastener stud of the class described having a base, a pair of yieldable socket-engaging portions located beneath said base and having diverging portions one of which is shorter than the other and converging portions the angles of which are dissimilar and the free end portions of said socket-engaging portion being arranged closely adjacent to each other for contact during attachment of and detachment from a part to which the stud is to be engaged.

4. A snap fastener stud of the class described formed from a single piece of sheet metal and having a base portion, a pair of yieldable socket-engaging portions extending from opposite ends of the base portion first in spaced relation thereto toward each other and substantially parallel to the plane thereof and extending away from the base and being shaped and arranged to make snap fastening engagement with a part to which the stud is to be fastened, and said base being split at opposite sides of the socket-engaging portions and bent to provide spring portions for the purposes illustrated and described.

5. A snap fastener stud of the class described formed from a single piece of sheet metal and having a base portion, a pair of yieldable socket-engaging portions connected to and extending from beneath said base portion, and said base having slits extending from the free edges part way through the material to provide spring portions connected thereto adjacent one end thereof and extending along the sides of the base substantially to the opposite end and disposed at an angle thereto.

PRESTON UPHAM.